(12) United States Patent
Fussell

(10) Patent No.: US 8,108,860 B2
(45) Date of Patent: **\*Jan. 31, 2012**

(54) METHOD FOR MANAGING MESSAGE FLOW IN A MULTITHREADED, MESSAGE FLOW ENVIRONMENT

(75) Inventor: David K. Fussell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 864 days.

This patent is subject to a terminal disclaimer.

(21) Appl. No.: 12/164,055

(22) Filed: Jun. 29, 2008

(65) Prior Publication Data

US 2008/0271040 A1 Oct. 30, 2008

Related U.S. Application Data

(63) Continuation of application No. 10/326,147, filed on Dec. 20, 2002, now Pat. No. 7,401,334.

(51) Int. Cl.
G06F 9/46 (2006.01)
G06F 3/00 (2006.01)

(52) U.S. Cl. .................. 718/101; 718/100; 719/313

(58) Field of Classification Search .................... 718/101
See application file for complete search history.

(56) References Cited

U.S. PATENT DOCUMENTS

| | | |
|---|---|---|
| 5,202,987 A | 4/1993 | Bayer et al. |
| 5,359,594 A | 10/1994 | Gould et al. |
| 5,423,044 A | 6/1995 | Sutton et al. |
| 5,560,029 A | 9/1996 | Papadopoulos et al. |
| 5,999,911 A | 12/1999 | Berg |
| 6,009,405 A | 12/1999 | Leymann |
| 6,052,684 A | 4/2000 | Du |
| 6,078,982 A | 6/2000 | Du |

(Continued)

FOREIGN PATENT DOCUMENTS

JP PUPA H03-018935 1/1991

(Continued)

OTHER PUBLICATIONS

Heinlein, Christian, "Workflow and Process Synchronization with Interaction Expressions and Graphs", Apr. 2-6, 2001, Proceedings International Conference on Data Engineering,17th, Heidelberg, pp. 243-252.

(Continued)

*Primary Examiner* — Kenneth Tang
(74) *Attorney, Agent, or Firm* — Anthony V S England; David Mims; Joseph P. Lally

(57) ABSTRACT

In one form, a method for managing message flow includes processing messages concurrently by processing nodes in a computer software application. The processing nodes include at least one set of lock acquisition, system resource access and lock release nodes interconnected in a flow path. In such a set, the nodes are interconnected in a flow path and process a respective one of the messages in a sequence defined by the flow path. The processing includes granting access to a system resource exclusively for the set's respective message responsive to the lock acquisition node processing its respective message. The system resource is accessed for the message responsive to the set's system resource node processing the message. The accessing of the resource for the message includes changing a certain system state. The exclusive accessing of the system resource is released responsive to the set's lock release node processing the message.

5 Claims, 6 Drawing Sheets

U.S. PATENT DOCUMENTS

| | | | |
|---|---|---|---|
| 6,374,311 | B1 | 4/2002 | Mahany et al. |
| 6,397,192 | B1 | 5/2002 | Notani et al. |
| 6,742,015 | B1 * | 5/2004 | Bowman-Amuah .......... 718/101 |
| 7,228,547 | B2 * | 6/2007 | Yaung ............................ 718/106 |
| 2002/0186251 | A1 | 12/2002 | Himmel |
| 2002/0186252 | A1 | 12/2002 | Himmel |

FOREIGN PATENT DOCUMENTS

| | | |
|---|---|---|
| WO | WO 00/58873 | 10/2000 |
| WO | WO 02/13020 A2 | 2/2002 |
| WO | WO 02/15614 A1 | 2/2002 |

OTHER PUBLICATIONS

Hwang, D.J. et al., "Multithreaded Node Architecture for Supporting Hybrid Computational Model", Chongbo Kwahakhoe Nonmunji (Journal of the Korea Information Science Society, vol. 20 Issue 1, Jan. 1993, pp. 88-101.

Gawlick, Dieter, "The Database as the Application Integration Platform", http://research.microsoft.com/~gray/HPTS99/papers/Gawlick.htm.

Alonso, Gustavo, et al., "Distributed Data Management in Workflow Environments", http://www.inf.ethz.ch/department/IS/iks/publications/files/RIDE97.pdf.

Schuldt, Keiko, et al., Atomicity and Isolation for Transactional Processes, ACM Transactions on Database Systems, vol. 27, No. 1, Mar. 2002, pp. 63-116.

Bhandari, et al., "Reconfigurable-Metanet: Fault-Tolerant Routing and Flow Control Mechanism on Locally-Ordered Ring-in-tree Embedding", IBM Disclosure YO8920073, TDB v38, n8 Aug. 1995, pp. 5-10.

* cited by examiner

METHOD FOR MANAGING MESSAGE FLOW IN A MULTITHREADED, MESSAGE FLOW ENVIRONMENT

CROSS-REFERENCE TO RELATED APPLICATION

This application is a continuation of prior application Ser. No. 10/326,147, which was originally filed on Dec. 20, 2002.

BACKGROUND

1. Field of the Invention

The present invention concerns managing system state for a system having multiple messages for related transactions in a message flow environment, and more particularly concerns nodes in such an environment for granting and releasing, to a selected one of the messages, exclusive access to a system resource.

2. Related Art

To put business enterprise data to more productive use, the data must be moved reliably among different software applications. That is, businesses want applications located anywhere within their enterprise to be linked together, and even to send messages to systems of other business enterprises, such as those of their customers and suppliers. A simple example is of two payroll systems that need to communicate with each other. Numerous issues arise in this effort, not the least of which concerns communication among disparate applications running on heterogeneous networked platforms using diverse data formats. In the payroll example, for instance, both of the systems may have employee names but with a name stored in one field in one system and in more than one field in the other system. Moreover, the problem illustrated by the payroll example is relatively simple. Data produced by one application may have a data structure that is more unrecognizable to another application. It is of course possible to transform data between applications, but as data is shared among more and more systems the overhead becomes unacceptable, and future maintenance becomes a large and often messy job.

This situation has led to an increasing focus on integration tools, such as IBM's WebSphere MQSeries Integrator ("WMQI"), for developing message processing applications with a common Application Programming Interface (API). ("WebSphere MQSeries Integrator" is a trademark of IBM.) An enterprise integration application developed with software such as WMQI typically acts as a distribution hub, i.e., a sort of a broker, for messages passing among other applications, and may accordingly be referred to herein as a "Broker." In this centralized location, definitions are configured specifying how messages are to be transformed and routed. This arrangement tends to eliminate the need for numerous interfaces between applications and to free developers from worrying about platform differences, such as different operating systems.

This kind of enterprise integration application is typically characterized by graphical tools and a high level flow language for configuring a flow of messages on a structure of interconnected nodes, including numerous predefined nodes, creating what may be referred to as a "workflow" or "message flow" environment. That is, within the Broker, individual functions are assigned to a collection of interconnected nodes, with the processing and transformation activities taking place in the nodes. Through the deployment of predefined and customized nodes, a sophisticated processing environment is built in which nodes perform operations on message data within a message flow, and have the ability to access information outside the message flow, such as information in a database or an external application, and to leave the message flow by placing a message on a queue.

Certain support is typically provided for multithreading in a Broker such as WMQI. A message can be read from a queue to begin the message flow and can be placed into a queue to terminate the flow of the message. There can be multiple flow paths between the input and terminating nodes, with respective messages concurrently flowing through different paths, each message handled by its own thread. Moreover, even if there is only one flow path between the input and terminating nodes, concurrent instances of the same message flow are supported, with each instance processing its own respective message read from the queue.

For such multithreaded messages it is important to maintain system state. For example, two multithreaded transactions, or even two multithreaded messages for the same transaction, may access a common resource, such as a database. The manner in which the threads access the resource may be important for transactional integrity, i.e., for maintaining the system in a proper state. However, in conventional workflow applications processing nodes do not automatically and explicitly maintain transactional integrity of messages flowing through the system. Instead, the developer must carefully maintain transactional integrity within the bounds of the message flow by diligently structuring the Broker application and applying its predefined transactional properties.

One known way to structure a message flow application to maintain transactional integrity among threads is to force related messages to join. See for example, Notani et al., U.S. Pat. No. 6,397,192 B1, "Synchronizing One or More Workflows Using One or More Synchronization-Join Activities That Include Synchronization Logic," May 28, 2002. However this may cause a performance penalty, particularly when this joining includes forcing multiple-threads to become essentially single-threaded. Therefore, a need exists for improvements in a multithreaded message flow environment to manage multiple messages for related transactions.

SUMMARY OF THE INVENTION

The forgoing need is addressed in the present invention. In one form of the invention, a method for managing message flows includes processing numerous messages concurrently by instructions associated with respective processing nodes (also referred to as "workflow nodes") in a computer software application. (Herein, a message being processed by instructions associated with such a node may be referred to simply as being "processed by the node.") The processing nodes include at least one set of lock acquisition, system resource access and lock release nodes interconnected in a flow path (also referred to herein as a "workflow flow path" or simply a "workflow"). In such a set, the lock acquisition, system resource access and lock release nodes of the set are interconnected in a flow path and process a respective one of the messages in a sequence defined by the flow path. The processing includes granting access to a system resource exclusively for the set's respective message responsive to the set's lock acquisition node processing its respective message. The system resource is accessed for the message responsive to the set's system resource node processing the message. The accessing of the resource for the message includes changing a certain system state. The exclusive accessing of the system resource is released responsive to the set's lock release node processing the message.

Herein the term "workflow process" is used to refer to an instance of a process for processing a message by instructions associated with nodes in a flow path. It should be appreciated that according to the above description a system resource is selectively protected by a "lock" mechanism to lock out, i.e., prevent, multiple workflow processes from using the resource simultaneously. In order for a workflow to use the system resource, that workflow must currently own the "lock". Only one workflow process for a given transaction may own the lock at any given instance.

Objects, advantages, additional aspects, and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
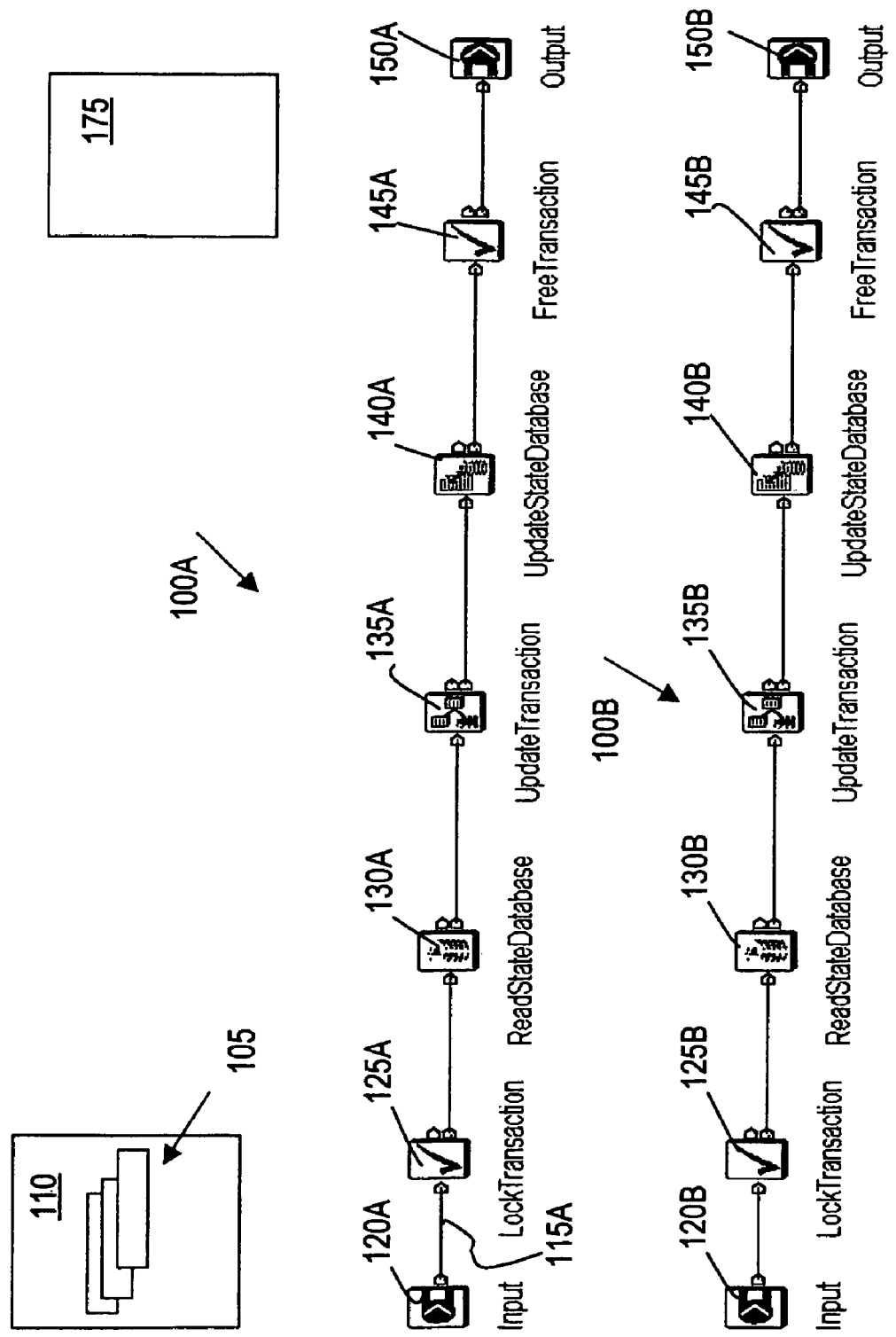
FIG. 1 illustrates workflows in a computer application program using locking and releasing nodes for messages in financial transactions, according to an embodiment of the present invention.

Referring now to FIG. 1, flow paths 100A and 100B, first and second instances of a flow path, are illustrated for a computer application program, according to an embodiment of the present invention. The flow paths 100A and 100B are for processing financial transactions that require a finite state machine to manage the transactions from inception to completion. As used herein, the term "financial transaction" includes a transaction involving updating of account information or a transfer of a financial asset of any sort, including a depository account, security, mutual fund, promissory note, security agreement, commercial paper, or real estate. The flow paths 100A and 100B each have a number of nodes 120A through 150A and 120B through 150B, respectively, interconnected by connections. (Connection 115A, between node 120A and 125A, is explicitly numbered for illustration.) Although only two flow paths 100A and 100B are illustrated, there may be multiple instances of the flow paths, or there may only be one instance, depending on the circumstances. That is, a financial transaction is embodied by a message and requires access to a system resource, in this case a database. A number of messages 105 are shown waiting in an input queue 110 for availability of a thread from a thread pool (not shown). Upon thread availability, a first instance of a flow path 100A is created and the input node 120A for the instance removes a message 105 from the queue 110.

The actions that are proper for one of these financial transactions depend upon the state of the system, in particular the state of a certain system resource, i.e., the previously mentioned database. There may be messages 105 in the queue 110 for more than one transaction, but there may also be numerous messages 105 for the same transaction. Respective messages 105 may be processed concurrently by the set of nodes associated with an instance of a flow path, e.g. nodes 120A through 150A associated with flow path 100A. In the embodiment of FIG. 1, there is a second message 105 for the same transaction and the second message 105 for the transaction is processed concurrently in another flow path instance, i.e., flow path 100B. Consequently, a transactional integrity issue arises according to which something must be done to ensure that only proper actions are performed for the transaction and the state of the database. That is, when work is done on the transaction for each of the messages 105 the database state will change, and actions that were appropriate in the former state of the database may no longer be appropriate in the new state. For this reason, only one set of actions for one message may properly be taken for the transaction at a given time, and the set of actions must be completed before another action may begin for the other message related to the same transaction. Moreover, the action but must be completed before the accessing for the other, or else the integrity of state of the database will be corrupted, or at least indeterminate.

To address this issue, the flow paths 100A and 100B use respective "lockTransaction" nodes 120A and 120B, i.e., a type of node referred to herein more generally as a "locking node." With respect to those messages 105 being processes by respective instances of nodes 120A and 120B which relate to the same transaction, the locking nodes 120A and B grant exclusive access to the database to only one of the messages 105. According to an aspect of the embodiment, such a lockTransaction node does not prevent access to the database or other such system resource for other concurrent messages that are related to different transactions. This aspect improves system performance. In other embodiments, however, a lockTransaction node does prevent access to the database or other such system resource for other concurrent messages regardless of whether the messages are related to different transactions.

As an example, the transaction may be a payment regarding a particular bank account. One message 105 may be a payment, which would result in a transfer of funds from the account to another account, while another message 105 is to cancel the payment, which, of course, would result in leaving the funds in the account. The accessing of the database is for posting information to the database concerning the transfer from the account, such as a debit to the database in the case of the payment message or else, in the case of the cancellation message, posting of a stop-payment indicating in the database to override the payment instruction if the payment message is processed later. The locking nodes 120A and 120B ensure that processing is serialized for the messages 105, but just with respect to the messages 105 relating to the same transaction and just with respect to accessing the database.

It is advantageous to system performance that the locking is limited in the above fashion rather than serializing to a broader extent. That is, in some applications other processing of messages for the same transaction, besides accessing the database, may not be precluded. Since the locking is limited just to locking access to the database such other processing may proceed. Likewise, it is advantageous that processing is not halted by the locking node for other messages that do not relate to the same transaction.

To illustrate in more specific detail, processing by flow path 100A is now further described. If the account database is already locked by another instance of node 120A, e.g., node 120B, then the instance of node 120A waits for the lock on the database to be released. If the database is not already locked by another instance of node 120A, then message 105 is further processed by locking node 120A for the transaction. Responsive to this processing by node 12A, the accessing of the database is locked for other messages 105 relating to the same transaction. Then, for the message 105 that is granted exclusive access to the database by node 120A, processing by a ReadStateDatabase node 130A reads the state of the database for the message 105. Next, in an UpdateTransaction node 135A the transaction state is updated and in an UpdateStateDatabase node 140A the state of the database is updated for the message 105. The updating of the database would include, for example, the previously mentioned debit for the payment message or the stop-payment indication for the cancel payment message. The updating of the transaction would include, for example, indicating a payment was made or stop payment had been approved. It may include changes regarding the date on which payment is expected, changes in who is to be paid, who is responsible from making payment, currency to be used for payment, or even some text string containing special instructions to buyer or seller.

Next, after processing by node 140A has updated the database for the message 105, the exclusive accessing of the database is released responsive to the FreeTransaction node 145A processing the message 105, and the message 105 is then placed in an output queue 175 by processing responsive to node Output 150A. Responsive to the FreeTransaction node 145A releasing the lock on the database, nodes are free to access the database for other messages 105 in other instances of the flow path relating to the same transaction, such as flow path 100B illustrated.

Figure 2:
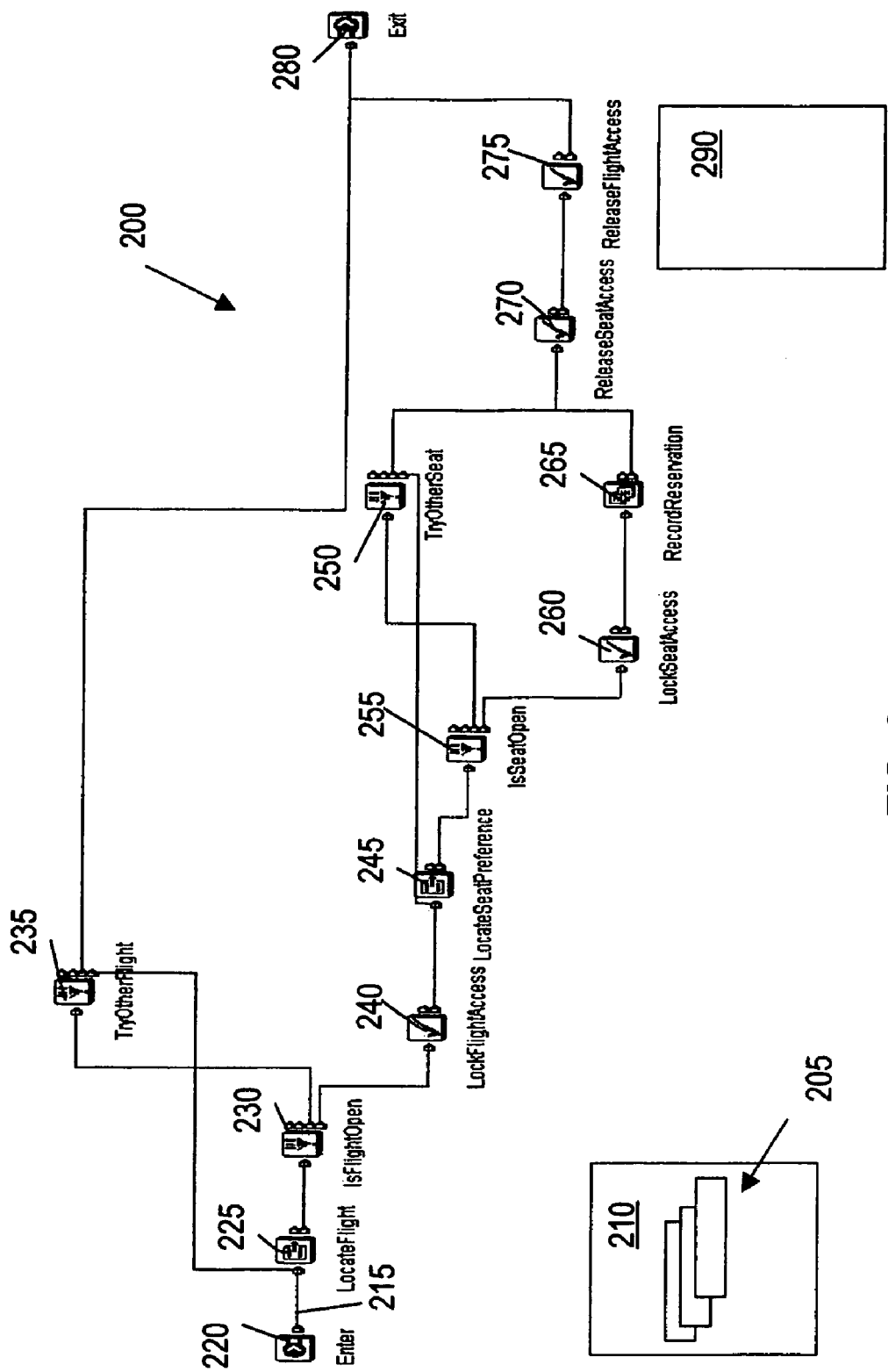
FIG. 2 illustrates workflows in a computer application program using locking and releasing nodes for messages in airline reservation transactions, according to an embodiment of the present invention.

Referring now to FIG. 2, an instance of a flow path 200 is illustrated for a computer application program using locking and releasing nodes for messages in airline reservation transactions, according to an embodiment of the present invention. The example of FIG. 2 may also be applicable to reservations of any kind, including reservations for a hotel or a performance event. The flow path 200 has a number of nodes 220 through 280 interconnected by connections. (An element number for connection 215, between node 220 and 225, is explicitly set out for illustration.) Once again, although only one flow path 200 is illustrated (with sub-paths in this case) there may be multiple instances of the flow path 200. And also as in the previous example, the reservation transaction is embodied by a message and requires access to system resources, in this case a flight information database and a seat mapping database. Messages 205 arise from ticketing agents, web programs, customers, etc. seeking to book flights, including seat assignments. The messages 205 wait in an input queue 210 for availability of a thread from a thread pool (not shown). Upon availability of a thread, the flow path 200 is instantiated for the thread and the input node 220 for the path 200 instance removes a message 205 from the queue 210.

In the embodiment of FIG. 2, as in FIG. 1, actions that are proper depend upon the states of the databases. Respective flight reservation messages 205 may be processed concurrently by the set of nodes associated with an instance of the flow path 200. If there is more than one reservation message 205 for the same flight and seat assignment and these multiple messages 205 are processed concurrently, an integrity issue arises. That is, the potential problem of multiple bookings of the same seat on the same flight must be managed within the bounds of the message flow path 200 instances.

Enter node 220 passes its message 205, via connector 215, to LocateFlight node 225, which locates the flight indicated by the message 205. Next, IsFlightOpen node 230 determines whether the flight is open to receive bookings. If not, the message is passed to TryOtherFlight node 235, which prompts the ticket agent, customer, etc. to request a different flight, which may include informing the agent, etc. about potential flights. Responsive to receiving a new request, the message is passed by node 235 once again to node 225, the flight is located, and node 230 determines whether the flight is open to receive bookings. Alternatively, if the agent, customer, etc. elects not to make a new request then the node 235 passes the message 205 to node 280 to exit without reserving a flight.

Once an open flight is located by node 230 the message 205 is passed to LockFlight-Access node 240. If the flight information database is not already locked by another instance of node 240, then the present instance of node 240 locks access to the flight information database for the particular flight, thereby preventing other messages 205 for the same flight from accessing the database, and the present node 240 grants exclusive access to its message 205. If the flight information database is already locked by another instance of node 240, then the present instance of node 240 waits for the lock on the flight information database to be released. (This may be implemented by assigning a token to the flight information database for each flight. In this manner, a node 240 grants exclusive access to the database for the flight responsive to receiving the token.)

Next, at LocateSeatPreference node 245, information about seat preference is located for the message 205 that was granted access to the flight information database. This may include looking up information in the passenger's account, or prompting for and receiving manual input. Seat preference may include row seats versus aisle seats, front seats versus back seats, seats over a wing or not over a wing, etc.

Once a seat preference has been obtained, the message 205 is passed to IsSeatOpen node 255, which queries the seat mapping data base to determine whether specific seats of the type indicated by the preference are available. If a seat of the type preferred is not available then message 205 is passed to TryOtherSeat node 250, which asks the agent whether to try again or give up and just book nothing. If the agent selects to try again, the flow returns the message to node 245, which searches for or prompts for a manual input of a new preference.

Once it is determined at node 255 that a seat is open of the type preferred, the message 205 is passed to LockSeatAccess node 260. If the seat mapping database is not already locked by another instance of node 260, e.g., if the node 260 receives a token for the seat mapping database for the particular flight, then the present instance of node 260 locks access to the database for the particular flight, thereby preventing other messages 205 for the same flight from accessing the database, and the present node 260 grants exclusive access to its message 205. Then the message 205 that was granted access to the seat mapping database is passed to RecordReservation node 265, which records the seat assignment and flight reservation in the flight information and seat mapping databases. The information recorded in the databases is also appended to the message 205 for further processing.

Next, the message 205 is passed to ReleaseSeatAccess node 270, which releases the seat mapping database with respect to the particular flight, such as by once again making available the token for the seat mapping database that was assigned to node 260. Then the message is passed to ReleaseFlightAccess node 275, which likewise releases the flight information database with respect to the particular flight, such as by once again making available the token for the flight information database that was assigned to node 240. Next, node 275 passes the message 205 to Exit node 280, which in turn places the message in an output queue 290 where it can await further processing (not shown), which may include generating a notification to the agent and customer, printing a ticket, etc., based on the information appended to the message 205.

Figure 3:
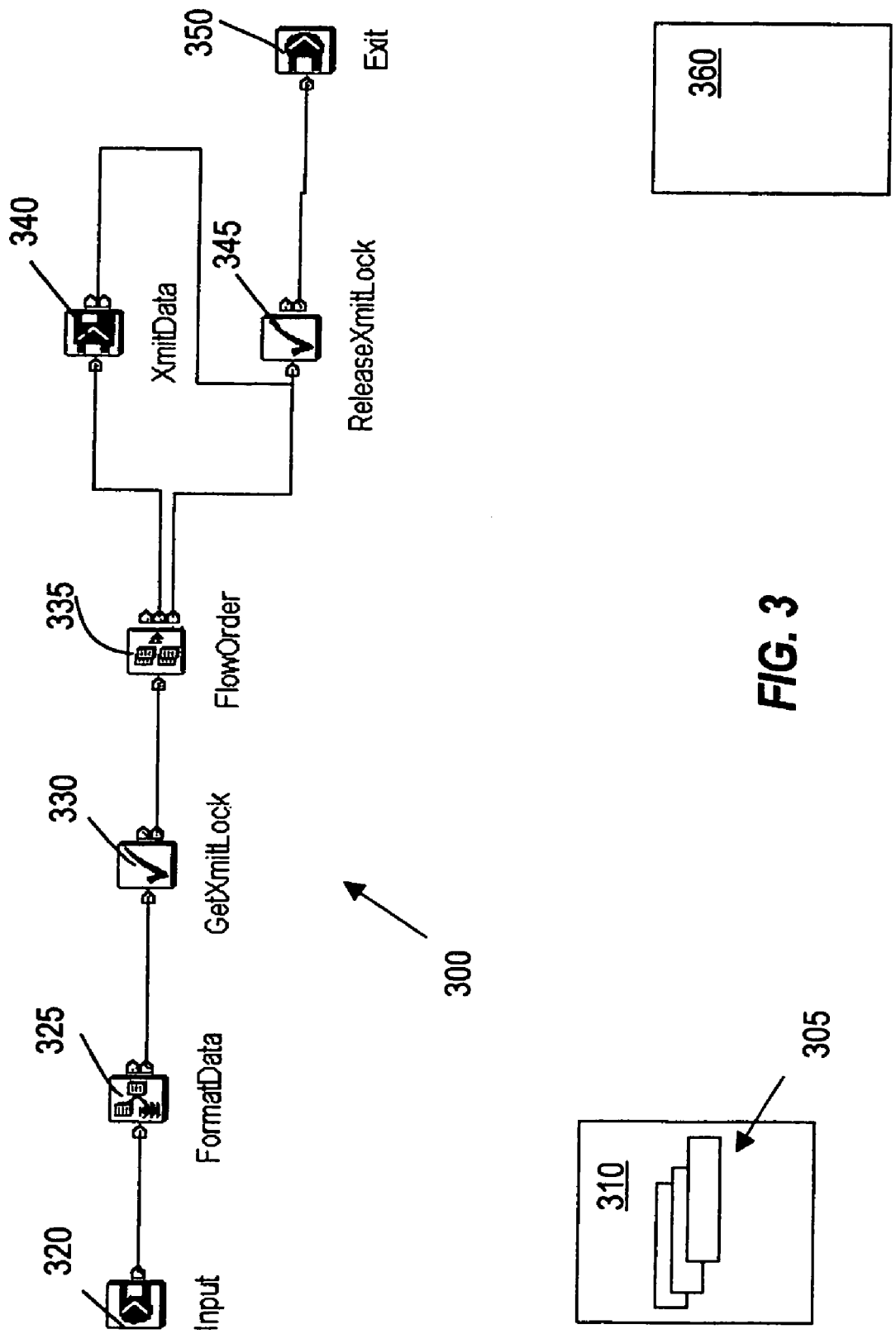
FIG. 3 illustrates workflows in a computer application program using locking and releasing nodes for messages accessing a multiplexed transmission line, according to an embodiment of the present invention.

Referring now to FIG. 3, an instance of a flow path 300 is illustrated for a computer application program using locking and releasing nodes for messages accessing a transmission line (not shown) to perform some communication transaction, according to an embodiment of the present invention. The example of FIG. 3 is generally applicable to a variety of communication transactions, including transactions involving the sending and receiving data packets, such as according to a TCP/IP protocol. Once again, there may be multiple instances of the flow path 300. That is, messages 305 wait in an input queue 310 for availability of a thread from a thread pool (not shown). Upon thread availability, the flow path 300 is instantiated and the Input node 320 for the instance removes a message 305 from the queue 310. The message 305 is than passed to FormatData node 325, which formats the data for the system or application to which the message 305 is being transmitted.

The next proper action depends upon the state of the transmission line. Therefore, the message 305 is passed next to GetXmitLock node 330. If the line is already locked by another instance of node 330, then the present instance of node 330 waits for the lock on the line to be released. If the transmission line is not already locked by another instance of node 330, then the present instance of node 330 locks access to the transmission line, thereby preventing other messages 305 from accessing line, and the present node 330 grants exclusive access to its message 305. The message 305 is then passed to FlowOrder node 335, which passes the message 305 to XmitData node 340 and after the code associated with node 340 is executed, i.e., the message 305 processing at node 340 is completed, then passes the message to ReleaseXmitLock node 345. At node 340 the message is transmitted on the transmission line. Then the message is passed to node 345, which releases the line, such as by once again making available a token for the line that was assigned to node 330. Next, node 345 passes the message 305 to Exit node 350, which in turn places the message 305 in an output queue 360 where it can await further processing (not shown).

Referring now to FIG. 4, aspects are illustrated for of a method for managing message flows, according to an embodiment of the present invention. As previously, messages 405 in queue 410 may be processed concurrently by instructions associated with respective computer software application processing nodes. A first message 405.1 is processed by a first thread of instructions associated with a first set of processing nodes, including lock acquisition node 420A, system resource access node 425B and lock release node 425C. The nodes of the set are interconnected in a workflow 410A defining a sequence for processing the workflow's message 405.1. A second message 405.2 is processed by a second thread of instructions associated with a second set of processing nodes, including lock acquisition node 420B, system resource access node 425B and lock release node 430B. The nodes of the second set are also interconnected in a workflow 410B. Workflow 410B may be another instance of workflow 410A.

The processing for workflow 410A includes granting exclusive access to a system resource 450 for the workflow's message 405.1 responsive to the workflow's lock acquisition node 420A processing its respective message 405.1 at time t0. (The granting of access is illustrated as acquiring an instance of a lock 402$x$.) Likewise, the processing for workflow 410B includes granting exclusive access to the system resource 450 for the workflow's message 405.2 responsive to the workflow's lock acquisition node 420B processing its respective message 405.2 at time t2.

The processing for workflow 410A also includes accessing 426A the system resource 450 for the message 405.1 responsive to the workflow's system resource node 425A processing the message 405.1. This includes the message 405.1 changing a certain system state. Since the system resource node 425A is after the grant node 420A in workflow 410A, and the system resource 450 is accessed responsive to processing by the system resource node 425A, the system resource cannot be accessed until after the grant node 420A acquires the lock 402$x$ for message 405.1.

Likewise, the processing for workflow 410B also includes accessing 426B the system resource 450 for the message 405.2 responsive to the workflow's system resource node 425B processing the message 405.2, which also includes the message 405.2 changing a certain system state.

The processing for workflow 410A also includes releasing the exclusive accessing of the system resource 450 responsive to the workflow's lock release node 430A processing the message 405.1. Likewise, the processing for workflow 410B also includes releasing the exclusive accessing of the system resource 450 responsive to the workflow's lock release node 430B processing the message 405.2.

In the embodiment illustrated in FIG. 4, the first message 405.1 is for a transaction X and the second message 405.2 is for the same transaction X. For both messages 405.1 and 405.2, the exclusivity of the access granted to the system resource 450 by the respective lock acquisition nodes 425A and 425B is responsive to the identity of the respective message's transactions. Accordingly, lock 402$x$ Thus, if the lock acquisition node 425A for the first message 405.1 has granted the first message 405.1 access to the system resource 450, as shown in FIG. 4, the lock acquisition node 425B for the second message 405.2 denies the second message 405.2 access to the system resource 450 until the lock release node 430A for the first message 405.1 releases the lock 402$x$, i.e., the exclusive accessing, at time t1, since the first message and the second message are for the same transaction X.

Figure 4A:
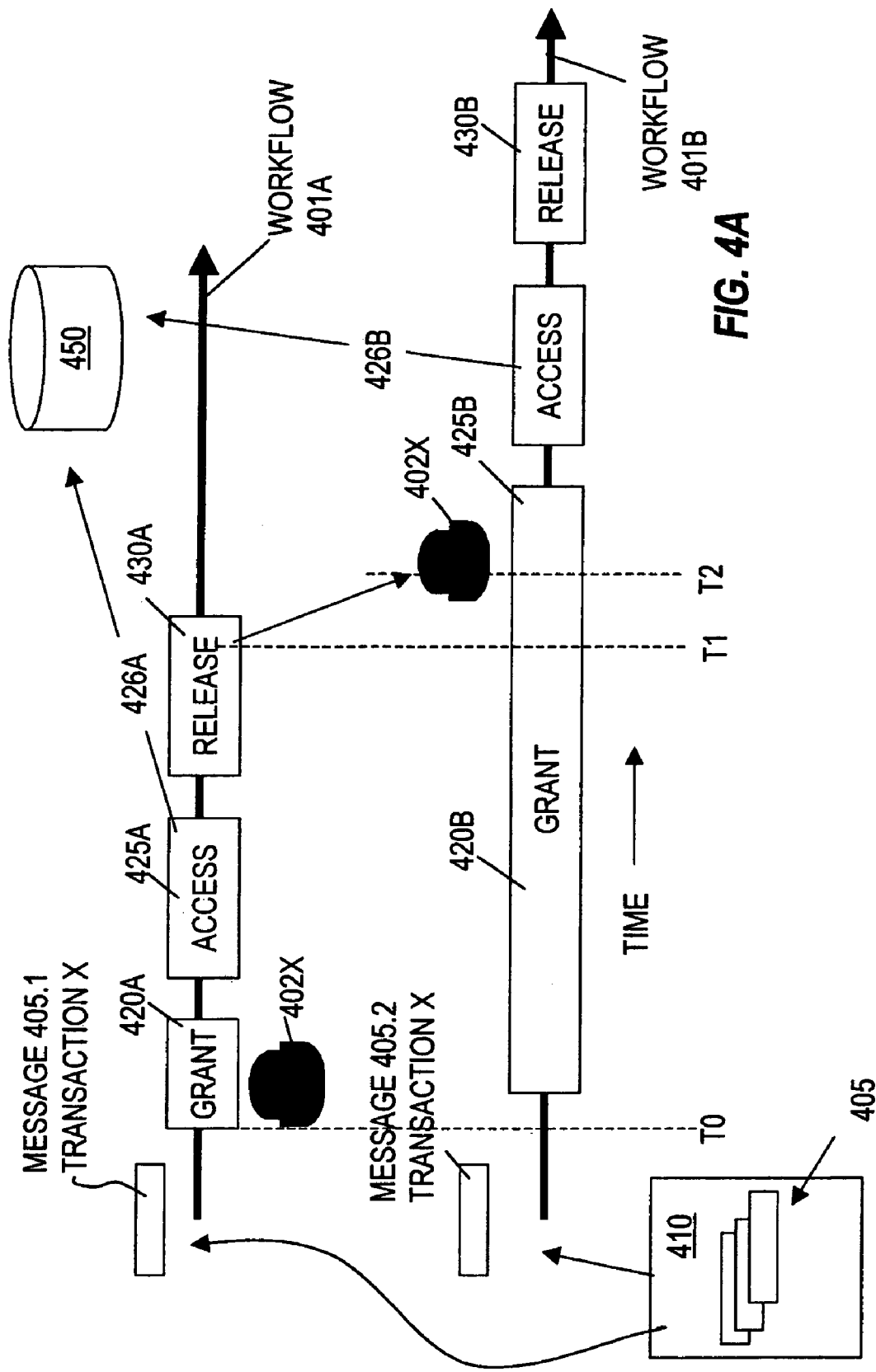
FIG. 4A illustrates additional aspects of workflows for two messages relating to the same transaction, according to an embodiment of the present invention.

In other words, in the example depicted in FIG. 4A since the system resource node 425B is after the grant node 420B in workflow 410B, and the system resource 450 is accessed responsive to processing by the system resource node 425B, and since message 405.1 has acquired the lock 402$x$ before message 405.2, the system resource 450 cannot be accessed for message 405.2 until after the release node 430A releases the lock 402$x$ at time t1 and grant node 420B acquires the lock 402$x$ for message 405.2 at time t2. Note that this does not involve joining the instruction threads, but merely involves the lock acquisition nodes 420A and 420B both checking for common transactions, and, if common transactions are found, acquiring and releasing the lock 402$x$ for the common transactions responsively.

Figure 4B:
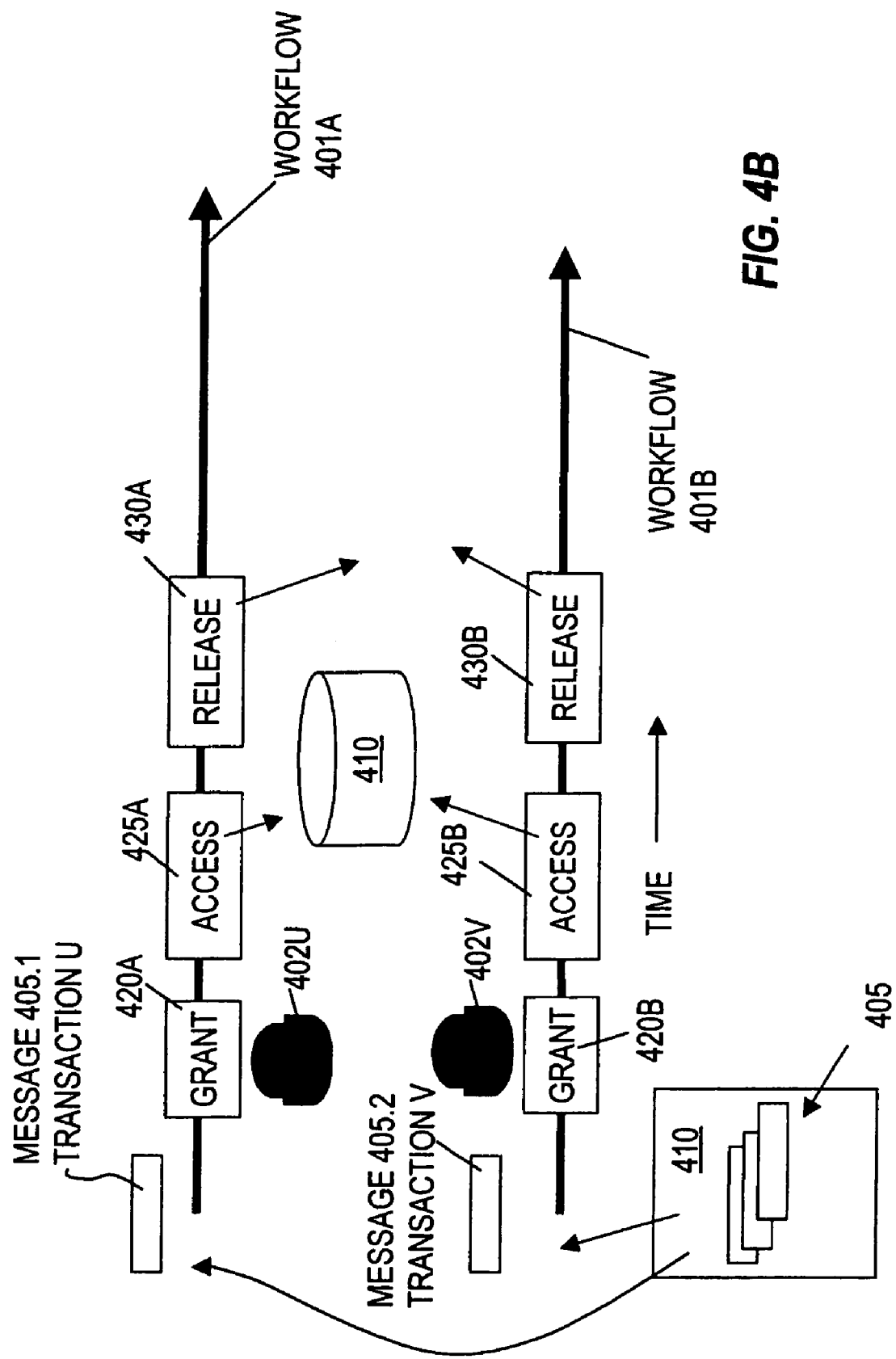
FIG. 4B illustrates additional aspects of workflows for two messages relating to the different transactions, according to an embodiment of the present invention.

Referring now to FIG. 4B, the same workflows 410A and 410B are shown but with the messages 405.1 and 405.2 in this instance being for different transactions this time. Specifically, message 405.1 is for a transaction U, while message 405.2 is for a transaction V. According to the embodiment of the method depicted, since the messages 405.1 and 405.2 are for different transactions, the second message 405.2 is granted access to the system resource 450 by the lock acquisition node 425B for the second message 405.2 independently of whether the lock release node 430A for the first message 405.1 has released the exclusive accessing. Thus, as shown, messages 405.1 is granted a lock 402u while message 405.2 is granted a lock 402v at the same time by their respective lock acquisition nodes 420A and 420B, so both processing for messages 405.1 and 405.2 may access the system resource 450 at the same time.

In another embodiment (not shown), the exclusivity of the accessing of the system resource is independent of identity of the transaction for a lock acquisition node's message. In this case, independently of whether the first and second messages are for different transactions, if the lock acquisition node for the first message has granted the first message access to the system resource the second message access is denied access to the system resource by the lock acquisition node until the lock release node for the first message releases the exclusive accessing, just as shown in FIG. 4A where the messages are both for the same transaction.

Figure 5:
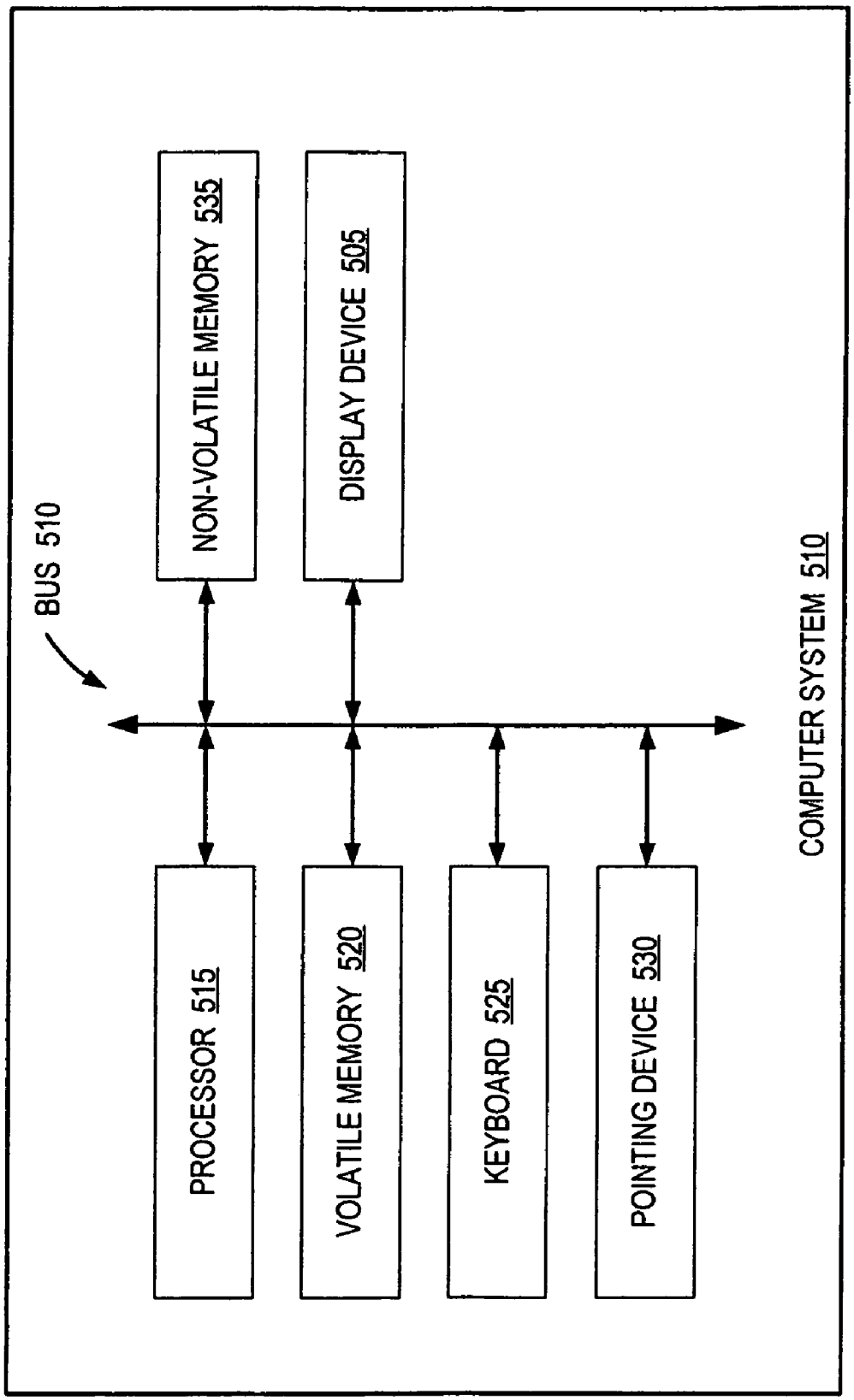
FIG. 5 illustrates a computer system for an system form of the present invention.

Referring now to FIG. 5, a computer system 510 is shown that is generally applicable for the embodiments described. The system 510 includes a processor 515, a volatile memory 520, e.g., RAM, a keyboard 525, a pointing device 530, e.g., a mouse, a nonvolatile memory 535, e.g., ROM, hard disk, floppy disk, CD-ROM, and DVD, and a display device 505 having a display screen. Memory 520 and 535 are for storing program instructions, which are executable by processor 515 to implement various embodiments of a method in accordance with the present invention. Components included in system 510 are interconnected by bus 540. A communications device (not shown) may also be connected to bus 540 to enable information exchange between system 510 and other data carriers.

In various embodiments system 510 takes a variety of forms, including a personal computer system, mainframe computer system, workstation, Internet appliance, PDA, an embedded processor with memory, etc. In one embodiment, the system 510 is an IBM RISC 6000 system running the AIX or Linux operating system and the WMQI application. In another, the WMQI application is running on an IBM NetVista system 510 and the Windows NT operating system. It should be understood that the term "computer system" is intended to encompass any device having a processor that executes instructions from a memory medium.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

While the present invention has been described in the context of a software application and a computer system, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present embodiment has been presented for purposes of illustration, but is not intended to be exhaustive or to limit the invention to the form disclosed. Many modifications and variations will be apparent to those of ordinary skill in the art.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method for managing work flows wherein messages may be processed concurrently by instructions associated with respective computer software application processing nodes, the method comprising:

providing logical nodes for processing on a computer system, including predefined input and termination processing nodes;

providing graphical tools and a language for configuring a flow of messages on a structure of interconnected ones of the logical, processing nodes in order to create a workflow environment, wherein processing and transformation activities in the workflow environment take place in the interconnected processing nodes on the computer system such that the nodes perform operations on message data according to a work flow having a message flow path between the input and terminating nodes, wherein the predefined nodes enable concurrent instances of the work flow between the input and terminating nodes, and wherein the predefined nodes include a system resource access node for accessing a system resource outside the work flow and further include a lock acquisition node and a lock release node, but the predefined nodes do not include predefined functions for automatically maintaining integrity of the accessed system resource for the respective messages;

processing a first message by a certain set of the processing nodes, the certain set of nodes being interconnected in a certain workflow defining a message flow path for processing messages of the certain workflow, including the first message;

processing a second message by the certain set of processing nodes, wherein the certain workflow includes at least the respective predefined lock acquisition, system resource access, and lock release nodes, and the processing for the certain workflow includes:

granting access to a system resource for messages of the certain workflow by the certain workflow's lock acquisition node;

accessing the system resource for the workflow's messages by the certain workflow's system resource node, wherein the accessing of the resource includes changing a certain state of the resource; and releasing the accessing of the system resource by the certain workflow's lock release node, wherein the first and second messages are for transactions and the accessing is further responsive to identity of transactions of the first and second messages, wherein the granting of access to a system resource for the first message includes:

granting a locking token, wherein the locking token identifies the transaction associated with the first message, wherein the releasing of the accessing of the system resource includes:

releasing the locking token that identifies the transaction associated with the first message, wherein if the lock acquisition node for the first message has granted the first message access to the system resource, the method comprises:

denying the second message access to the system resource by the certain workflow's lock acquisition node until the certain workflow's lock release node releases the locking token that identifies the transaction associated with the first message, responsive to the first message and the second message being for the same transaction; and granting the second message access to the system resource by the certain workflow's lock acquisition node independently of whether the certain workflow's lock release node has released the locking token that identifies the transaction associated with the first message, responsive to the first message and the second message being for different transactions.

2. The method of claim 1, wherein the first and second messages are processed in concurrent instances of the certain workflow.

3. The method of claim 1, wherein the messages are for financial transactions.

4. The method of claim 1, wherein the messages are for reservation transactions.

5. The method of claim 1, wherein the messages are for communication transactions.

* * * * *